United States Patent [19]
Boger

[11] Patent Number: 5,728,942
[45] Date of Patent: Mar. 17, 1998

[54] FLUID PRESSURE MEASURING SYSTEM FOR CONTROL VALVES

[76] Inventor: Henry W. Boger, 58 Cannon Forge Dr., Foxborough, Mass. 02035

[21] Appl. No.: 563,982

[22] Filed: Nov. 28, 1995

[51] Int. Cl.[6] .................................................... G01L 7/00
[52] U.S. Cl. ............................... 73/756; 137/599; 73/203
[58] Field of Search ........................... 73/756, 202, 203; 138/40, 44; 137/599

[56] References Cited

U.S. PATENT DOCUMENTS

| | | | |
|---|---|---|---|
| 1,107,600 | 8/1914 | Fulweiler | 73/203 |
| 1,178,222 | 4/1916 | Earl | 73/203 |
| 3,600,945 | 8/1971 | Wenzel et al. | 73/388 |
| 3,713,337 | 1/1973 | Stroman | 73/205 R |
| 3,779,076 | 12/1973 | Akeley | 73/861.61 |
| 3,840,051 | 10/1974 | Asashi et al. | 138/37 |
| 4,319,492 | 3/1982 | Hewson et al. | 73/756 |
| 4,420,834 | 12/1983 | Wiley, III et al. | 372/35 |
| 4,433,575 | 2/1984 | Rutherford | 73/202 |
| 4,453,417 | 6/1984 | Moyers | 73/756 X |
| 4,559,275 | 12/1985 | Matt et al. | 428/596 |
| 4,711,268 | 12/1987 | Coleman | 73/756 X |
| 4,722,227 | 2/1988 | Grob et al. | 73/706 |
| 4,738,276 | 4/1988 | Adams | 73/756 X |
| 4,754,651 | 7/1988 | Shortridge et al. | 73/861.42 |
| 4,798,089 | 1/1989 | Frick et al. | 73/706 |
| 5,099,881 | 3/1992 | Nakajima | 137/599 |
| 5,251,148 | 10/1993 | Haines et al. | 364/509 |
| 5,255,716 | 10/1993 | Wilcox | 138/44 |
| 5,284,053 | 2/1994 | Wadlow et al. | 73/199 |
| 5,319,981 | 6/1994 | Mei et al. | 73/706 |
| 5,357,793 | 10/1994 | Jouwsma | 73/202 |

OTHER PUBLICATIONS

Flow Measurement Engineering Handbook, pp. 5–36 thru 5–45 and pp. 10–66 thru 10–67.
K. Akashi, H. Watanabe and K. Koga, *Development of New Flow Rectifier for Shortening Upstream Straight Pipe Length of Flow Meter*, Nov. 1979.
Brochure: Valtek StarPac™ Intelligent System.
3–Valve Manifolds–Swagelok® Company.

*Primary Examiner*—Richard Chilcot
*Assistant Examiner*—Paul D. Amvozowicz
*Attorney, Agent, or Firm*—Vinson & Elkins, L.L.P.

[57] ABSTRACT

A system for improving fluid pressure measurement in a control valve includes placing a flow conditioner adjacent to and upstream from averaging channels located at the inlet and outlet of the control valve, from which averaging channels the fluid is conducted to fluid pressure measuring devices.

15 Claims, 4 Drawing Sheets

FLUID PRESSURE MEASURING SYSTEM FOR CONTROL VALVES

FIELD OF THE INVENTION

The present invention pertains to control valves; more particularly, the present invention pertains to control valves which include a fluid pressure monitoring system.

BACKGROUND

In recent years it has become extremely important for control valve manufacturers to develop valve positioning mechanisms that can accurately sense fluid pressures at both the valve inlet and the valve outlet. The sensed pressures may then be used for various purposes to include adjusting fluid flow through the control valve. Thus, accurate fluid pressure measurement is critical.

Detracting from the accuracy of fluid pressure measurements through control valves are complex fluid flow components such as swirl, secondary or counter-rotational vortex flow, boundary layer flow and/or high-core velocity flow. Accordingly, an accurate measurement of fluid pressure at both the inlet and the outlet of a control valve can only be obtained by minimizing those components of fluid flow which detract from the accuracy of fluid pressure measurement.

Therefore, a need exists in the art to provide a system by which those components of fluid flow which detract from the accuracy of fluid pressure measurement in a control valve are minimized to increase the accuracy of fluid pressure measurement.

SUMMARY

The improved fluid pressure measuring system for control valves of the present invention minimizes those aspects of fluid flow which detract from the accuracy of fluid pressure measurement in control valves.

Specifically, a fluid flow conditioner is placed upstream and inboard of a substantially circular averaging channel. Once having passed through the fluid flow conditioner and into the averaging channel, fluid is conducted from the averaging channel to a fluid pressure measuring device. Thus, those components of fluid flow which detract from an accurate pressure measurement are removed by the fluid flow conditioner before the fluid ever enters the averaging channel on its way to the pressure measuring device. In the preferred embodiment, a fluid flow conditioner is located upstream of the flow path into the averaging channel on both the inlet and outlet sides of the control valve.

DESCRIPTION OF DRAWINGS

A better understanding of the improved fluid flow pressure measuring system for control valves of the present invention may be had by reference to the figures wherein.

DESCRIPTION OF EMBODIMENTS

Figure 1:
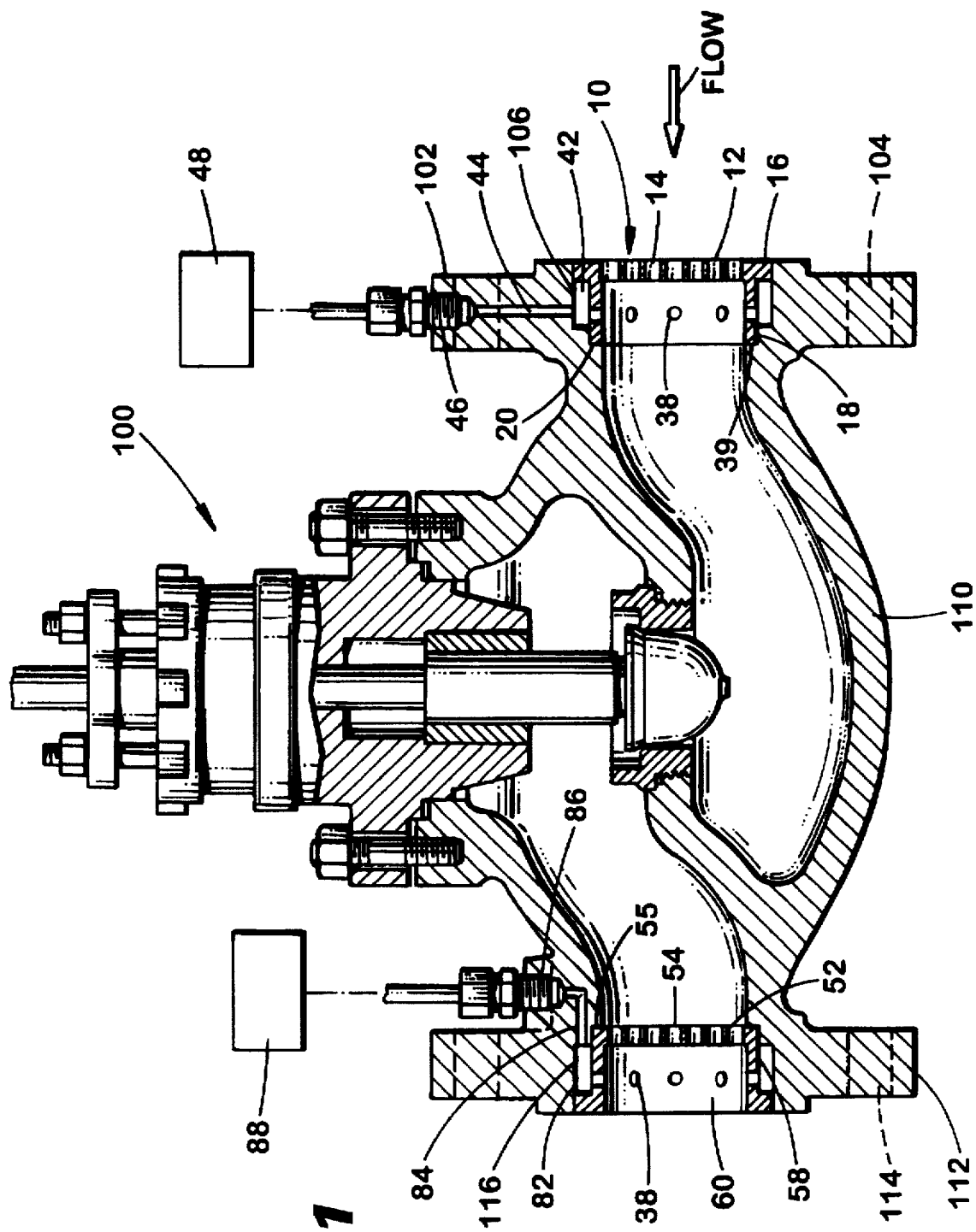
FIG. 1 is a cross-sectional view of a control valve incorporating the improved fluid pressure measuring system of the present invention.

By referring to FIG. 1, it will be seen that the improved fluid pressure measurement system 10 of the present invention is used in conjunction with a globe type control valve assembly 100. While illustrated and described for use with a globe type control valve assembly 100, those of ordinary skill in the art will understand that the present invention may be used with a wide variety of different types of control valves.

The control valve assembly 100 includes an inlet flange 102 which has a plurality of axial bolt holes 104 for connecting the control valve assembly 100 to a flange on another valve or to a fluid conduit such as a pipe, elbow or tee (not shown). A central opening 106 within the inlet flange 102 allows fluid to pass into the interior of the control valve assembly 100.

Located downstream from the inlet flange 102 is the body 110 of the control valve assembly 100. On the opposite end of the body 110 of the control valve assembly 100 from the inlet flange 102 is an outlet flange 112. Similar to the inlet flange 102, the outlet flange 112 includes a plurality of bolt holes 114 which surround a central opening 116. Note that an inlet fluid flow conditioner 12 and an outlet fluid flow conditioner 52 are placed within the openings 106 and 116 in the flanges 102 and 112, respectively.

Figure 3:
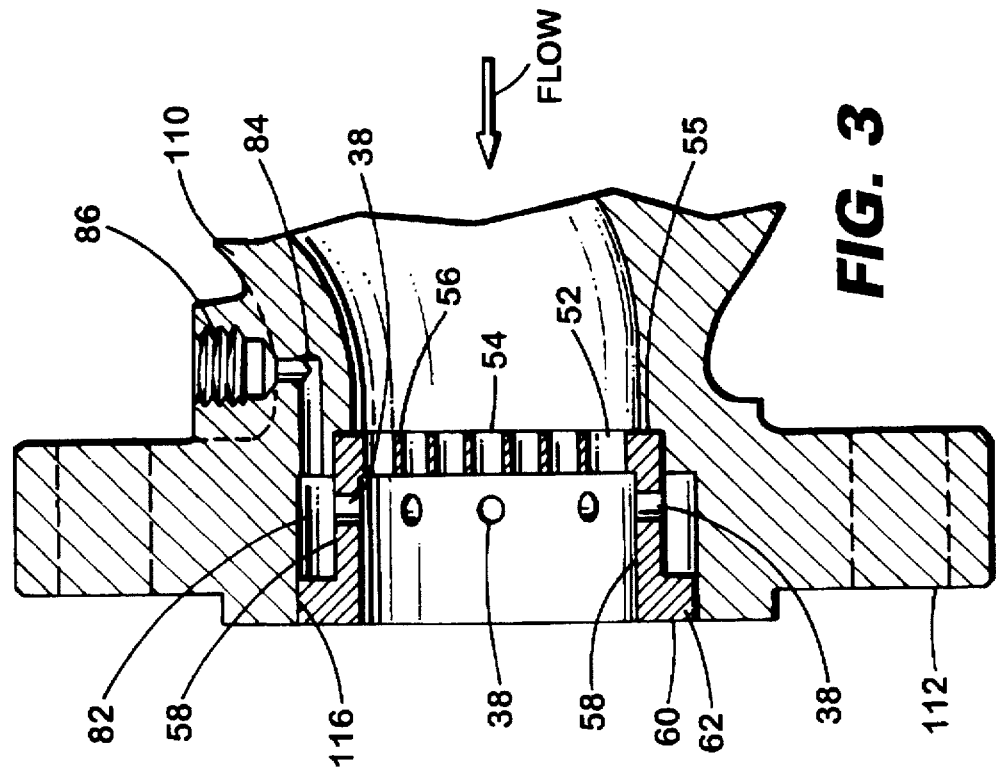
FIG. 3 is an enlarged cross-sectional view of the valve outlet.
Figure 2:
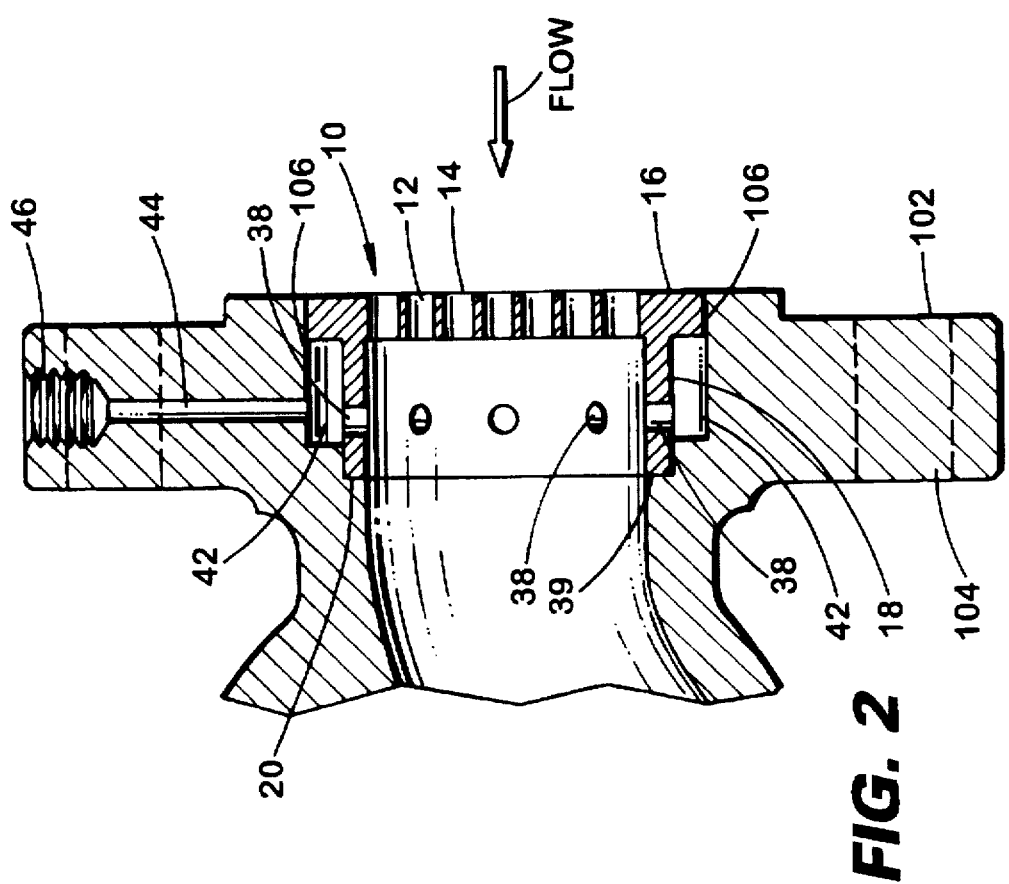
FIG. 2 is an enlarged cross-sectional view of the valve inlet.
Figure 4:
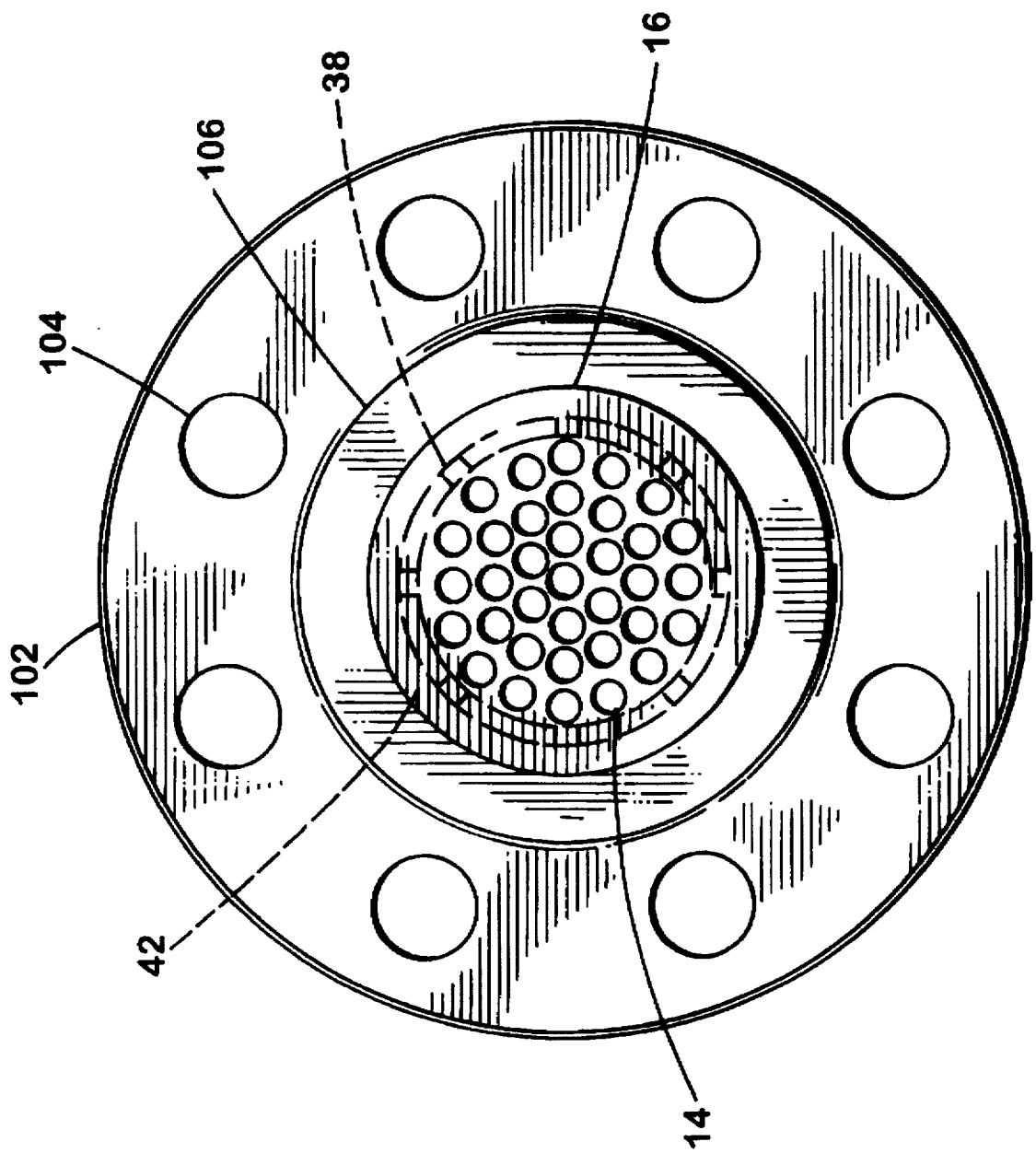
FIG. 4 is an end view of the valve inlet.

In FIG. 2 it may be seen how the improved pressure measuring system 10 is positioned on the inlet side of the control valve assembly 100. A similar arrangement for the outlet side of the control valve assembly 100 is shown in FIG. 3. A fluid flow conditioner 12 is fitted to mount within the opening 106. As shown in FIG. 4, in the preferred embodiment, the fluid flow conditioner 12 includes thirty-five openings 14 within a plate portion 16 sized to fit within the opening 106 in the inlet flange 102. Extending downstream from the plate portion 16 on the inlet side is a short cylindrical section 18 which both provides a radial fluid flow path 38 and a distal end 20 which positions the fluid conditioner 12 by abutting a shoulder 39 within the control valve housing 110.

In FIG. 3 it may be seen that on the outlet side of the control valve assembly 100 is a second fluid flow conditioner 52. The thirty-five openings 54 are in a plate portion 56 which abuts a shoulder 55 within the control valve housing 110. Extending downstream from the plate portion 56 is is a short cylindrical section 58 which both provides a radial flow path 38 and a distal end 60 with an external rim 62 to engage the opening 116 in the flange 112 on the outlet side of the control valve assembly 100.

The thirty-five openings arranged in a predetermined pattern in each of the inlet fluid flow conditioner 12 and the outlet fluid flow conditioner 52 minimize those fluid flow components which detract from accurate pressure measurement.

As previously indicated, both the short cylindrical section 18 on the inlet side of the valve 100 and the short cylindrical section 58 on the outlet side of the valve 60 include a plurality of radial fluid flow paths 38.

Outboard of the fluid flow paths 38 on both the inlet and the outlet sides of the control valve 100 is an averaging channel into which the flow conditioned fluid passes. Fluid flow to the averaging channel on either the inlet or outlet sides of the valve 100 is substantially perpendicular to the fluid flow through the flow conditioner on either side of the control valve 100.

Flow conditioned fluid is collected in the inlet averaging channel 42 before passing on to a fluid pressure measuring device 48. By referring again to FIGS. 1 and 2, it may be seen that, on the inlet side, flow conditioned fluid passes through the fluid flow paths 38 formed in the short cylindrical section 18 of the flow conditioner 12, thence through a radial passage 44 formed in the inlet flange 102 to a set of either tapered or straight pipe threads 46 formed in the inlet flange 102 at the end of the radial passage 44. Such configuration may be used on either the inlet or the outlet side of the control valve assembly 100.

By referring to FIGS. 1 and 3, it may be seen that on the outlet side of the control valve assembly 100 is an alternate configuration for the opening 84 leading away from the averaging chamber 82 and on to a fluid pressure measuring device 88. Instead of passing directly through the outlet flange 112, an axial passage 84 extends from the averaging chamber 82. This axial passage 84 then turns a right angle and terminates at a set of tapered or straight pipe threads 86 formed in the valve body 110. Such configuration may be used on either the inlet or outlet side of the control valve assembly 100.

Figure 5:
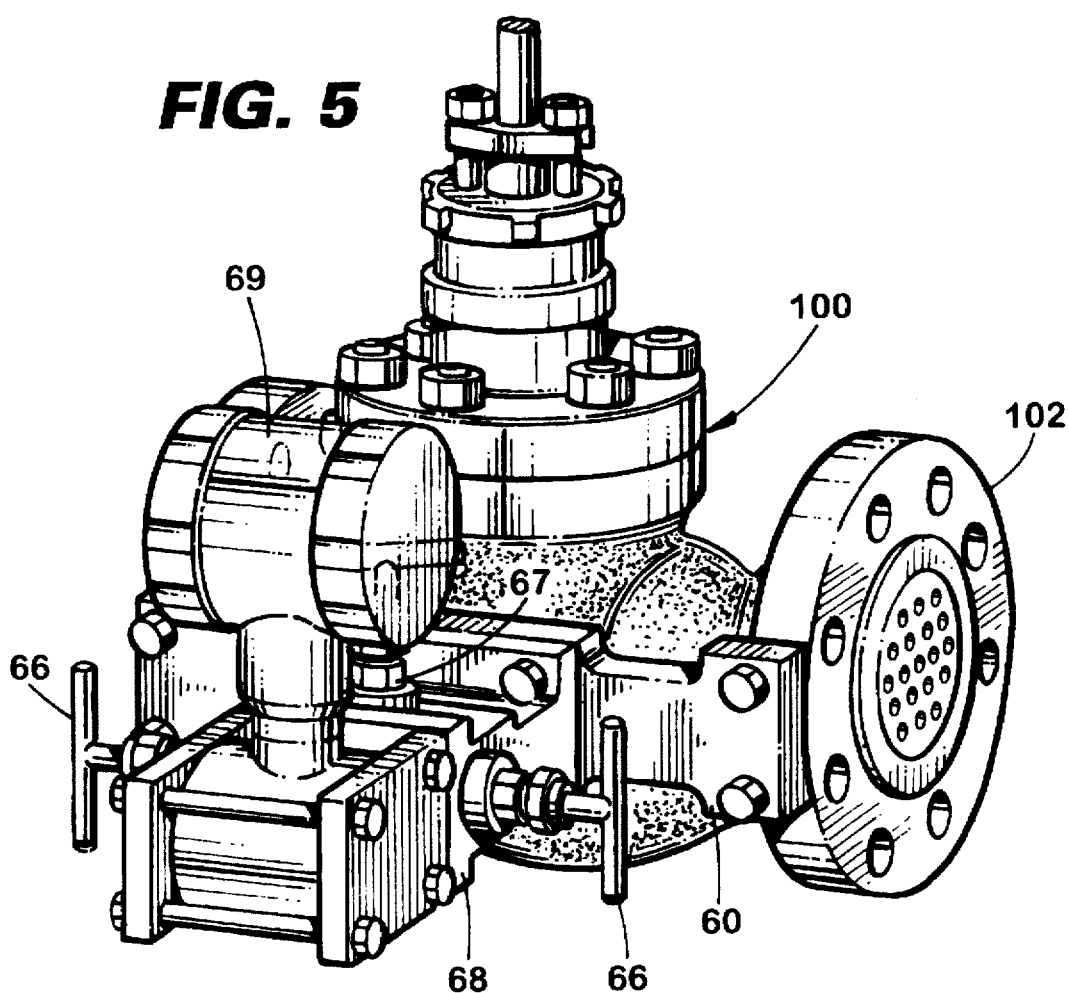
FIG. 5 is a perspective view of a control valve, including an external manifold block.
Figure 6:
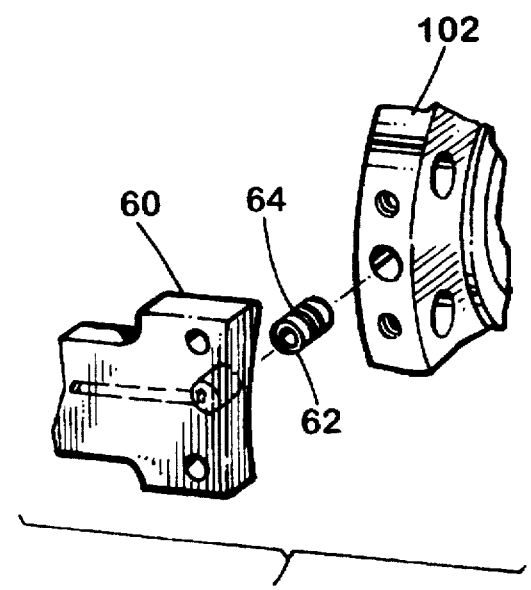
FIG. 6 is an exploded view of the control valve shown in FIG. 5 showing the attachment of the external manifold block to a flange of the control valve.

In FIGS. 5 and 6 is shown yet another configuration of a control valve assembly 100 incorporating the improved fluid pressure measuring system of the present invention. Specifically, a manifold block 60 is bolted to both the inlet flange 102 and the outlet flange 112. The fluid flow configuration from the averaging chambers 42 and 82 is like that shown in FIG. 2. To assure a leak-proof connection between one or both of the flanges on either end of the control valve assembly 100, a variety of different arrays of hardware may be used. Shown in FIG. 6 is but one example of a hardware connection utilizing a small connecting collar 62 encircled by two O-rings 64. A valve manifold 68 is sealingly connected to the manifold block 60 which extends between the two flanges on either end of the control valve assembly 100.

A differential pressure transmitter 69 may be sealingly connected to the valve manifold 68.

Inlet and outlet pressures may be blocked by closing valves 66. A third valve 67 may be opened to equalize pressure to the differential pressure transmitter for calibration.

There is provided by the present invention a system for improving fluid pressure measurement at either the inlet side of a control valve, the outlet side of a control valve, or both.

While the preferred embodiments of invention have been explained in the foregoing description, those of ordinary skill in the art will understand that variations to the disclosed embodiments are possible. Such variations shall fall within the scope and meaning of the appended claims.

I claim:

1. A system for improving the fluid pressure measurement at both the inlet and the outlet of a control valve, said control valve being constructed and arranged to utilize said fluid pressure measurement to control flow through said control valve, said system for improving fluid pressure measurement at both the inlet and the outlet of a control valve comprising:

fluid flow conditioners constructed and arranged to fit within the inlet and the outlet of the control valve;

a substantially circular averaging channel located outboard from and downstream from said fluid flow conditioners;

said substantially circular averaging channels constructed and arranged to surround the inlet and the outlet of the control valve; and conduits for conducting flowing fluid from said substantially circular averaging channels to a fluid pressure measurement device.

2. The system as defined in claim 1 wherein said fluid flow conditioners include a plurality of substantially circular openings formed in a plate mounted axially within the control valve.

3. The system as defined in claim 2 wherein said fluid flow to said substantially circular averaging channels is through a plurality of fluid flow paths positioned substantially radially to the flow of fluid through the control valve.

4. A system for measuring fluid pressure at both the inlet and the outlet of a control valve with a pressure measuring device, said control valve having an inlet mounting flange, an outlet mounting flange, and a valve body therebetween, said system comprising:

an inlet fluid flow conditioner positioned within the inlet mounting flange;

a substantially circular inlet averaging channel located outboard from and downstream from said fluid flow conditioner, said substantially circular inlet averaging channel having a diameter greater than the inlet of the control valve, but less than the outer diameter of the inlet mounting flange;

an outlet fluid flow conditioner positioned within the outlet mounting flange;

a substantially circular outlet averaging channel located substantially outboard from and downstream from said outlet fluid flow conditioner, said substantially circular outlet averaging channel having a diameter greater than the outlet of the control valve, but less than the outer diameter of the outlet mounting flange;

a passage for conducting fluid from said substantially circular inlet averaging channel to the pressure measuring device; and a passage for conducting fluid from said substantially circular outlet averaging channel to the pressure measuring device.

5. The system as defined in claim 4 wherein said passage for conducting fluid from said substantially circular inlet averaging channel to the pressure measuring device passes through the valve body.

6. The system as defined in claim 5 wherein said passage for conducting fluid from said substantially circular outlet averaging channel to the pressure measuring device passes through the valve body.

7. The system as defined in claim 6 wherein said substantially circular inlet averaging channel is fed by a plurality of substantially radial flow paths.

8. The system as defined in claim 7 wherein said substantially circular outlet averaging channel is fed by a plurality of substantially radial flow paths.

9. An adjustable flow control valve, said adjustable flow control valve being responsive to inlet and outlet pressures, said adjustable flow control valve comprising:

an inlet mounting;

an outlet mounting;

a valve body located between said inlet mounting and said outlet mounting;

an inlet fluid flow conditioner positioned within the inlet mounting;

a substantially circular inlet averaging channel located outboard from and downstream from said inlet fluid flow conditioner, said substantially circular inlet averaging channel surrounding the inlet mounting of the control valve;

an outlet fluid flow conditioner positioned within the inlet mounting;

a substantially circular outlet averaging channel located outboard from and downstream from said outlet fluid conditioner, said substantially circular outlet averaging channel surrounding the outlet mounting of the control valve;

a passage for conducting fluid from said substantially circular inlet averaging channel; and a passage for conducting fluid from said substantially circular outlet averaging channel.

10. The control valve as defined in claim 9 wherein said passage for conducting fluid from said substantially circular inlet averaging channel passes through the valve body.

11. The control valve as defined in claim 10 wherein said passage for conducting fluid from said substantially circular outlet averaging channel passes through the valve body.

12. The control valves defined in claim 11 wherein said substantially circular inlet averaging channel is fed by a plurality of substantially radial flow paths.

13. The control valve as defined in claim 12 wherein said substantially circular outlet averaging channel is fed by a plurality of substantially radial flow paths.

14. The control valve as defined in claim 13 further including a manifold block in fluid communication with said passage for conducting fluid from said substantially circular inlet averaging channel and said passage for conducting fluid from said substantially circular outlet averaging channel.

15. The control valve as defined in claim 14 further including a valve manifold in fluid communication with said manifold block, said valve manifold being in fluid communication with a differential pressure transmitter.

* * * * *